United States Patent
Pirk et al.

(10) Patent No.: US 9,478,826 B2
(45) Date of Patent: Oct. 25, 2016

(54) LAYER CONFIGURATION

(75) Inventors: Tjalf Pirk, Stuttgart (DE); Mehran Ghahremanpour, Stuttgart (DE); Joachim Saegebarth, Heimsheim (DE); Martin Bogner, Stuttgart (DE); Hermann Sandmaier, Villingen-Schwenningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 230 days.

(21) Appl. No.: 14/115,540

(22) PCT Filed: Mar. 7, 2012

(86) PCT No.: PCT/EP2012/053889
§ 371 (c)(1),
(2), (4) Date: Apr. 7, 2014

(87) PCT Pub. No.: WO2012/150064
PCT Pub. Date: Nov. 8, 2012

(65) Prior Publication Data
US 2014/0227607 A1    Aug. 14, 2014

(30) Foreign Application Priority Data

May 4, 2011 (DE) .......................... 10 2011 075 202

(51) Int. Cl.
*H01M 10/0565* (2010.01)
*H01M 4/62* (2006.01)
*H01M 10/0525* (2010.01)

(52) U.S. Cl.
CPC ......... *H01M 10/0565* (2013.01); *H01M 4/624* (2013.01); *H01M 10/0525* (2013.01); *Y02E 60/122* (2013.01); *Y02P 70/54* (2015.11)

(58) Field of Classification Search
CPC .......... H01M 4/624; H01M 10/0525; H01M 10/0562; H01M 10/0565
See application file for complete search history.

(56) References Cited

U.S. PATENT DOCUMENTS 6,165,645 A * 12/2000 Nishimura ............ H01M 6/181
429/218.1
6,197,450 B1 * 3/2001 Nathan .................. H01G 9/016
29/623.1

(Continued)

FOREIGN PATENT DOCUMENTS

CN   101240077 A   8/2008
CN   101798393 A   8/2010

(Continued)

OTHER PUBLICATIONS

International Search Report for PCT/EP2012/053889, issued on Jul. 2, 2012.

*Primary Examiner* — Stewart Fraser
(74) *Attorney, Agent, or Firm* — Norton Rose Fulbright US LLP

(57) ABSTRACT

A configuration includes at least three successive layers, the three layers having a top electrode layer, a bottom electrode layer, and an electrolyte layer situated between the top electrode layer and the bottom electrode layer. At least the electrolyte layer and one of the top electrode layer or the bottom electrode layer have an organic matrix, and the organic matrix of the electrolyte layer has an ionic conductivity in a range of $\geq 10^{-6}$ S/cm. Such a configuration is suitable in particular for forming a rechargeable lithium-ion battery and permits simple and cost-effective manufacturing and good adaptability to the desired application.

12 Claims, 1 Drawing Sheet

(56) References Cited

U.S. PATENT DOCUMENTS

| | | | | |
|---|---|---|---|---|
| 6,645,675 B1 * | 11/2003 | Munshi | | H01B 1/122 |
| | | | | 252/62.2 |
| 6,664,006 B1 * | 12/2003 | Munshi | | H01M 4/13 |
| | | | | 29/623.1 |
| 2010/0216032 A1 * | 8/2010 | Baba | | H01M 4/366 |
| | | | | 429/322 |
| 2012/0110835 A1 * | 5/2012 | Hudson | | H01M 4/0404 |
| | | | | 29/623.1 |

FOREIGN PATENT DOCUMENTS

| | | | |
|---|---|---|---|
| CN | 101924220 A | 12/2010 | |
| DE | 19964159 | 2/2001 | |
| DE | 10020031 | 11/2001 | |
| DE | 69903073 | 5/2003 | |
| WO | WO2010/054272 | 5/2010 | |
| WO | WO 2010054272 A1 * | 5/2010 | .......... H01M 4/0404 |

* cited by examiner

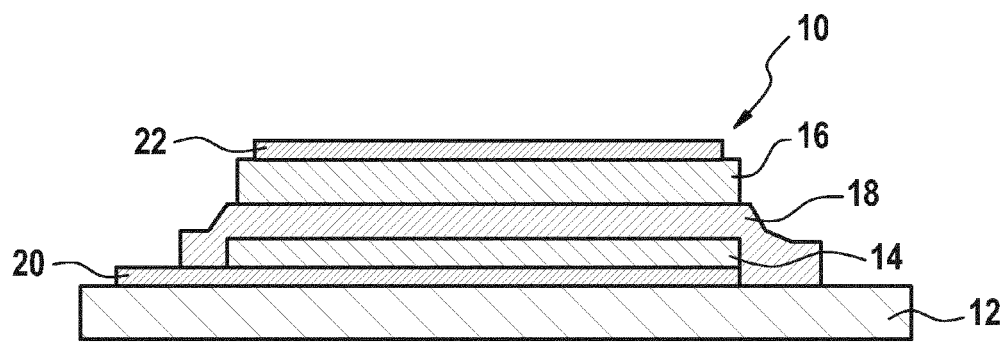

LAYER CONFIGURATION

FIELD OF THE INVENTION

The present invention relates to a layer configuration including two electrode layers and an electrolyte layer situated between the electrode layers. The present invention relates in particular to a rechargeable lithium-ion battery including the layer configuration.

BACKGROUND INFORMATION

Lithium-ion batteries, i.e., rechargeable lithium-ion batteries, are in widespread use today. They are preferred for use in portable devices such as cell phones or mobile computers in particular. Their advantages lie in their high power density and capacitance density in particular. Attempts have already been made to manufacture rechargeable lithium-ion batteries by using semiconductor methods in thin-film technology. However, the performance values were usually limited due to the small quantities of active material in the thin, two-dimensional layers, but such thin-film rechargeable batteries are already used in energy-saving equipment.

One interesting perspective for applications not at the bottom end of the performance spectrum is also demonstrated theoretically by so-called three-dimensional batteries. With such batteries, i.e., rechargeable batteries, the useful area for thin-film batteries is folded over a structured substrate and thus the stored capacitance is many times greater with the same substrate base area, and furthermore, the stored charge is received and delivered more rapidly. Therefore this also makes available a higher power.

German Published Patent Appln. No. 199 64 159 also describes a method for manufacturing materials having electrochemical properties. Such materials are formed from paste-like compositions which are suitable for manufacturing primary batteries or rechargeable batteries, for example. In the case of a rechargeable battery, for example, it may have three successive layers, the outermost layers of which may function as the electrodes, whereas the mid-layer may be designed as an electrolyte layer. In addition to the functional substances, each layer includes an organic matrix and additional additives, if necessary. The electrode layers may contain, for example, a solid substance in addition to the ion storage substances; this solid substance functions in particular to improve the mechanical properties of the organic matrix, in particular with respect to supporting or processing them. The electrolyte layer has cages in which a liquid is situated, which functions as the actual electrolyte. The electrolyte may include an aqueous system, for example.

SUMMARY

The subject matter of the present invention is a configuration including at least three successive layers, the three layers having a top electrode layer, a bottom electrode layer and an electrolyte layer situated between the top electrode layer and the bottom electrode layer, at least the electrolyte layer and one of the top and bottom electrode layers having an organic matrix, and the organic matrix of the electrolyte layer having an ionic conductivity in a range of $\geq 10^{-6}$ S/cm.

A configuration according to the present invention thus includes at least three layers, which are in succession and are thus directly adjacent to one another. The at least three layers are preferably situated in parallel and are directly adjacent to one another. Two of the at least three layers have the property of an electrode, namely in particular a good ion storage capacity and a good electrical conductivity. These layers are therefore referred to below as electrode layers. A layer having the function of an electrolyte is situated between the electrode layers. It therefore has in particular a good ionic conductivity in a range of $\geq 10^{-6}$ S/cm.

According to the present invention, at least two adjacent layers of the at least three layers have an organic matrix. An organic matrix in the context of the present invention refers in particular to an organic material, in particular a polymeric material which forms the corresponding layer as the sole component or which has additional auxiliaries or additional components, which may preferably be finely distributed in the matrix. Furthermore, according to the present invention, the organic matrix includes a material based on an organic or polymeric material but also containing other substances in chemically or physically bound form. The organic content of the organic matrix is particularly preferably in a range of $\geq 30\%$.

An organic material or an organic matrix includes in particular a carbon compound such as a hydrocarbon compound, for example, as the characterizing unit.

Due to the fact that at least two organic layers are provided, a particularly simple manufacturing method in a short period of time is made possible. The organic layers may be easily fused on one another and/or to another layer, for example, an inorganic layer. For example, an organic layer may be applied by a traditional printing operation. Structuring is simple and accurate due to the use of a screen or a stencil or a laser. In addition, the properties of the organic layers may be adjusted as desired in this way and in a precisely defined manner. For example, the thickness and the geometry may be adapted to the desired application in a particularly simple and accurate manner. Furthermore, auxiliaries may be embedded in the organic matrix in a simple manner to thereby adjust the mechanical and electronic properties of the corresponding layer to improve the properties of the configuration with respect to the desired field of application.

According to the present invention, it is provided that the ionic conductivity of the electrolyte layer or of the organic matrix of the electrolyte layer is in a range of $\geq 10^{-6}$ S/cm. The organic matrix thus has an adequate ionic conductivity in this way, so it is suitable for use, for example, as an electrolyte layer in batteries and rechargeable batteries such as a rechargeable lithium-ion battery. The organic matrix or the electrolyte layer is therefore usable as an electrolyte layer between the two electrode layers without further measures such as, for example, structural measures or manufacturing steps. For example, it is not necessary during manufacturing of the organic layer to add an electrolyte material to achieve suitable properties. It is not necessary in particular to form cages in the matrix of the organic material and to fill them with a liquid electrolyte, for example, in a further operating step. Therefore it is possible to save on operating steps as well as materials for manufacturing the electrolyte layer, which thus reduces the cost of manufacturing the organic layer and thus that of the configuration according to the present invention.

In addition, by omitting a traditional electrolyte such as a liquid electrolyte in particular, leakage of the configuration according to the present invention may be prevented entirely. This is advantageous in particular when using the configuration according to the present invention as a thin-film battery since the components and electronic devices equipped with such an energy store would be damaged by leakage of the electrolyte. In addition, many electrolytes are not without problems for the environment. Therefore, according to the present invention, disposal and/or reuse of the configuration according to the present invention is facilitated after damage, for example.

The organic electrode layers form a matrix because of their intrinsic ionic conductivity, this matrix permitting the distribution of ions to the embedded storage materials without requiring a high topographic surface as an interface to adjacent layers.

Within the context of a preferred specific embodiment of the present invention, the bottom electrode layer and the top electrode layer form an organic matrix. In this specific embodiment, it is thus possible to completely omit traditional electrode materials and electrolyte materials such as those known for lithium-ion batteries, for example. Instead, all layers have an organic matrix. The configuration according to the present invention is therefore particularly simple and cost-effective to manufacture and may also be used in many fields of application.

Within the context of another preferred specific embodiment of the present invention, either the bottom electrode layer or the top electrode layer includes a cathode storage material, which is selected from the group of oxidic materials, in particular from lithium-cobalt dioxide ($LiCoO_2$), lithium-iron phosphate ($LiFePO_4$), lithium-manganese oxide spinel ($LiMn_2O_4$) or mixed oxides including nickel and/or either the bottom electrode layer or the top electrode layer contains an anode storage material, selected from the group including silicon (Si), germanium (Ge), lithium (Li), a carbonaceous material or a metallic alloy. Consequently, in this specific embodiment, these electrode layers include an anode storage material for the case when only one electrode layer has an organic matrix, whereas the additional electrode layer is formed from or contains a traditional cathode material, this cathode material being known from the manufacture of a lithium-ion battery, for example. Accordingly, for the case when only one electrode layer has an organic matrix, this electrode layer may have a cathode storage material, whereas the additional electrode layer is formed from or contains a traditional anode material, which is known from the manufacture of a rechargeable lithium-ion battery, for example. For the case when both electrode layers have an organic matrix, one of the electrode layers has a cathode storage material but the other electrode layer has an anode storage material.

The cathode layer in particular has a high chemical potential with respect to lithium and permits the storage of lithium in a suitable manner, for example, during a discharge of a rechargeable lithium battery. In one embodiment as an anode, the electrode layer has a preferably low chemical potential with respect to the cathode and permits storage of lithium during charging of a rechargeable lithium-ion battery in particular.

Within the context of another preferred specific embodiment, the organic matrix includes a material which is selected from the group including chitosan, polyethylene oxide, an organic ionomer or an organic matrix having functional $SO_3X$ groups, wherein the X may denote, for example, monovalent ions such as alkali metal ions as well as lithium, sodium or potassium ions and ammonium ions. Such materials are inexpensive to manufacture, which also makes the entire configuration according to the present invention cost-effective. Furthermore, such organic materials are readily processable, so that the configuration according to the present invention is suitable for thin-film batteries and rechargeable batteries in particular. In addition, the aforementioned organic materials have an ionic conductivity, for use as an electrolyte layer in a suitable manner, but it is not necessary to add another electrolyte material such as, for example, an electrolyte fluid. In this way, the configuration according to the present invention is manufacturable in a particularly simple and cost-effective manner.

Within the context of another preferred embodiment of the present invention, at least one auxiliary is situated in the organic matrix. The at least one auxiliary may be suitable for improving the electronic properties of the corresponding layer in particular or for achieving an improvement in the mechanical properties. In addition the ionic conductivity, for example, may be improved through the auxiliary, in particular for the case when the organic matrix is situated in or forms the electrolyte layer at least in part. For the case when the organic matrix is situated in or forms the electrode layer, the electron conductivity or ion storage capacity in particular may be improved by the auxiliary. Furthermore, however, the mechanical properties may be improved by the auxiliary. In this case, for example, the stability of the organic matrix may be increased, so that the configuration according to the present invention need not be situated on a substrate. Suitable examples include, for instance, $SiO_2$, $Si_3N_4$, $Al_2O_3$, AlN, MgO, or also fibers, for example, glass fibers.

It is also preferable in particular for the auxiliary to include carbon nanotubes or for the auxiliary to include a material which is selected from the aforementioned group of cathode storage materials or for the auxiliary to include a material which is selected from the aforementioned group of anode storage materials.

When selecting the appropriate auxiliary, the intended use of the corresponding layer is taken into account in particular. If the auxiliary should be situated in the organic matrix of an electrode layer, for example, then carbon nanotubes in particular are advantageous since they are capable of increasing the electrical conductivity. In this function, carbon nanotubes may be situated in both electrode layers regardless of whether the electrode is a cathode or an anode. In an anode layer, they also help to increase the ion storage capacity. For the case of an anode, materials from the aforementioned group of anode storage materials are also advantageous, whereas in the case of a cathode, materials from the aforementioned group of cathode storage materials are preferred. The chemical potential with respect to lithium in particular is optimized by the auxiliaries identified above or the ion storage capacity is improved. Depending on the desired application, a suitable combination of auxiliaries may be provided.

Furthermore, it is preferred in particular that the at least one auxiliary is present in a quantity of up to 30 wt %. The desired effects are therefore achievable without having a significant negative influence on the processability of the organic matrix or the manufacture of the corresponding layers.

Within the context of an additional advantageous embodiment of the configuration according to the present invention, the configuration includes a substrate. The substrate may impart an improved stability to the configuration, in particular for the case when the individual layers have a low stability. This may be the case due to the design of very thin layers, for example.

Within the context of another advantageous embodiment of the configuration according to the present invention, a current collector layer is situated on the side of the top and/or bottom electrode layer(s) opposite the electrolyte layer. The current collector layer functions to improve the electrical conductivity of the corresponding electrode layer and also to provide a suitably designable contact of the electrode layer. For example, the current collector layer may be made of gold, platinum, aluminum, alloys or other materials having a good electrical conductivity.

The present invention also relates to an energy store such as in particular a rechargeable lithium-ion battery, which includes a configuration according to the present invention. The configuration according to the present invention is suitable for the assembly of a rechargeable lithium-ion battery in particular. The rechargeable lithium-ion battery according to the present invention is particularly simple to manufacture and its properties are readily adaptable to the intended use.

BRIEF DESCRIPTION OF THE DRAWING

FIG. 1 shows a schematic sectional view of one specific embodiment of the configuration according to the present invention, as seen from the side.

DETAILED DESCRIPTION

FIG. 1 shows a specific embodiment of configuration 10 according to the present invention. Configuration 10 may be part of a rechargeable lithium-ion battery, for example.

Configuration 10 according to the present invention may include a substrate 12 as a carrier. Substrate 12 may function to impart greater stability to the layers, as described below. However, substrate 12 is only optional and need not necessarily be present. For example, substrate 12 may be omitted if the layers have sufficient stability. Substrate 12 is made of a semiconductor material or a MEMS material, for example, such as silicon. Furthermore, substrate 12 may be made of a polymer or a metal. It is advantageous if the surface of substrate 12 is designed to be electrically insulating. Furthermore, if the material of substrate 12 is not electrically insulating per se, an insulation layer may be situated on substrate 12. This insulation layer may be a dielectric passivation layer, for example.

Configuration 10 according to the present invention also includes at least three successive layers situated on substrate 12, for example. The three layers include a bottom electrode layer 14, a top electrode layer 16 and an electrolyte layer 18 situated between top electrode layer 16 and bottom electrode layer 14. Electrolyte layer 18 here covers bottom electrode layer 14 at least partially, preferably completely, and separates two electrode layers 14, 16 from one another. According to the present invention, at least electrolyte layer 18 and one of top electrode layer 14 and bottom electrode layer 16 have an organic matrix.

With respect to electrolyte layer 18, according to the present invention this includes an organic matrix having an ionic conductivity in a range of $\geq 10^{-6}$ S/cm in order to have suitable electrolyte properties. Ion transport through electrolyte layer 18 is therefore ensured in a manner sufficient for a number of applications. The organic matrix may contain, for example, a material which is selected from the group including chitosan and polyethylene oxide (PEO), in particular also known as polyethylene glycol (PEG) in the case of shorter molecular chains. Such polymers have an ionic conductivity in the range according to the present invention and are therefore suitable as the electrolyte even without additional additives. Nevertheless, it is possible to add additional auxiliaries to the organic matrix in electrolyte layer 18 in order to, for example, improve or optimize the ionic conductivity and adapt it to the desired application. Examples of auxiliaries which increase the ionic conductivity here include electrolyte salts, for example, lithium salts, e.g., lithium hexafluorophosphate ($LiPF_6$) or lithium sulfite ($LiSO_3$). The auxiliaries are preferably finely distributed in the organic matrix.

In addition to electrolyte layer 18, at least top electrode layer 16 or bottom electrode layer 14 includes an organic matrix. In one specific embodiment, both top electrode layer 16 and bottom electrode layer 14 have an organic matrix. The organic matrix of corresponding electrode layer 14, 16 may in turn include a matrix containing essentially chitosan or polyethylene oxide. To create suitable properties as the electrode layer, an auxiliary should preferably be present in finely distributed form in the organic matrix. For this purpose, for example, carbon nanotubes or silicon, which improve the electrical conductivity in particular and increase the ion storage capacity of capacity-relevant ions, typically lithium ions, may be used. When using carbon nanotubes in particular, they may be adapted to the desired application through a corresponding pretreatment. For example, the defects in the carbon nanotubes may be oxidized, thereby achieving easier access for the lithium ions to the core of the carbon nanotubes. The conductivity and the ion storage capacity may therefore be increased. Another advantageous pretreatment is to disperse the carbon nanotubes in lithium lauryl sulfate (LLS), for example, to surround them with a shell of lithium ions.

It is possible to manufacture such a material, for example, by mixing the carbon nanotubes with a melt of an organic material. However, this depends on the melting point of the corresponding polymer, so that high-melting polymers such as chitosan cannot be used here. Alternatively, a solution or suspension of the organic material with the carbon nanotubes in a solvent may be used. The solvent is advantageously to be adapted to the corresponding organic material. The manufacturing route used, for example, is to be selected as a function of the selected organic material or polymer. The advantages of the aforementioned manufacturing methods lie in the possibility of manufacturing very thin layers in particular and in the simple and problem-free manufacture of the configuration according to the present invention.

The organic matrix may also include a corresponding electrode material as an auxiliary, which depends on the polarity of the particular electrodes. If the electrode layer is to be designed as a cathode, for example, then cathode storage materials such as oxidic materials, in particular lithium-cobalt dioxide ($LiCoO_2$), lithium-iron phosphate ($LiFePO_4$), lithium-manganese oxide spinel ($LiMn_2O_4$) or mixed oxides containing nickel are suitable in particular. However, if the electrode layer is to be designed as an anode, anode storage materials such as silicon (Si), germanium (Ge), lithium, a carbonaceous material or a metallic alloy are advantageous here in particular.

In addition, one of electrode layers 14, 16 may be made of a material other than an organic matrix. The precise embodiment of corresponding electrode layer 14, 16 is in turn dependent in particular on its function, i.e., on whether it is to be used in particular as a cathode or as an anode. A high chemical potential with respect to lithium and a high potential for lithium storage during a discharge operation are advantageous for use as a cathode, whereas a preferably low chemical potential with respect to lithium and good lithium storage during a charge operation are advantageous for use as an anode.

For the case when the cathode has an organic matrix, the anode may be made of a traditional material known for the manufacture of rechargeable lithium-ion batteries. For example, the anode in this case may be made of a material such as silicon, germanium, carbon (for example, graphite) or metallic alloys as well as others of the anode storage materials cited above. This material may be applied directly to substrate 12 or to electrolyte layer 18 by a suitable method such as a deposition method or a composite of such materials with carrier substances, conduction mediators or binders may be used.

Likewise, for the case when the anode has an organic matrix, the cathode is formed from a traditional material known for the manufacture of rechargeable lithium-ion batteries, some of which were mentioned above and were referred to as cathode storage materials. The electrode layer functioning as a cathode may in this case be deposited directly on substrate 12 or on electrolyte layer 18, for example, by a sputtering process, or a composite of such materials with carrier substances, conduction mediators or binders may be used.

Fundamentally, top electrode layer 16 should be complementary to bottom electrode layer 14, i.e., a cathode and an anode should be present. Furthermore, corresponding electrode layers 14, 16 should not have any direct contact with corresponding complementary electrode layers 14, 16.

A bottom current collector layer 20 and a top current collector layer 22 may be situated beneath bottom electrode layer 14 as well as above top electrode layer 16, i.e., on the side opposite the electrolyte layer. Current collector layer 20, 22 is advantageously made of a material having a good electrical conductivity, such as a metal, an alloy or a polymer having good conductivity. Current collector layer 20, 22 is used to improve the electrical conductivity of bottom electrode layer 14 and top electrode layer 16 in particular or to extract a contact out of the layer system, i.e., to create an electrical contact at a suitable location, for example, on substrate 12. It should be avoided here that corresponding current collector layer 20, 22 has contact with the respective complementary current collector 22, 20 or with electrode layer 14, 16 connected to complementary current collector layer 22, 20.

Finally, configuration 10 may include a passivation layer such as a metal layer, a metal-polymer composite or a ceramic layer, for example, having corresponding insulations to enclose configuration 10 or to cover the corresponding layers for the case when a substrate 12 is present. Therefore, a degradation of the function due to environmental influences may be eliminated or reduced.

Transition areas may be formed at the corresponding boundary transitions of layers 14, 16, 18 due to the different chemical and mechanical properties. To optimize or stabilize the function of the present invention, these transition areas may be defined with additional intermediate layers, which are applied in separate steps. These intermediate layers may suppress diffusion of nonfunctional components, auxiliaries or ions, for example.

What is claimed is:

1. A configuration, comprising:
   at least three successive layers including a top electrode layer, a bottom electrode layer, and an electrolyte layer situated between the top electrode layer and the bottom electrode layer, at least the electrolyte layer and one of the top electrode layer and the bottom electrode layer having an organic matrix, wherein the organic matrix of the electrolyte layer has an ionic conductivity in a range of $\geq 10^{-6}$ S/cm;
   wherein the layers having an organic matrix form a matrix because of their intrinsic ionic conductivity, and wherein the matrix permits a distribution of ions to embedded storage materials without requiring a high topographic surface as an interface to adjacent layers, and
   wherein the organic matrix includes a material which is selected from the group including chitosan or an organic matrix having functional $SO_3X$ groups.

2. The configuration as recited in claim 1, wherein the bottom electrode layer and the top electrode layer include an organic matrix.

3. The configuration as recited in claim 1, wherein at least one of:
   one of the bottom electrode layer and the top electrode layer includes a cathode storage material which is selected from a group of oxidic materials including lithium-cobalt dioxide, lithium-iron phosphate, lithium-manganese oxide spinel or mixed oxides including nickel, and
   one of the bottom electrode layer and the top electrode layer includes an anode storage material which is selected from a group including silicon, germanium, lithium, a carbonaceous material or a metallic alloy.

4. The configuration as recited in claim 1, wherein the organic matrix includes a material which is selected from the group including chitosan, polyethylene oxide, an organic ionomer or an organic matrix having functional $SO_3X$ groups.

5. The configuration as recited in claim 1, wherein at least one auxiliary is situated in the organic matrix.

6. The configuration as recited in claim 5, wherein the auxiliary includes at least one of carbon nanotubes, a cathode storage material, and an anode storage material.

7. The configuration as recited in claim 5, wherein the auxiliary is present in a quantity of up to 30 wt %.

8. The configuration as recited in claim 1, further comprising a substrate.

9. The configuration as recited in claim 1, further comprising a current collector layer situated on a side of one of the bottom electrode layer and the top electrode layer opposite the electrolyte layer.

10. An energy store, comprising:
    a configuration including at least three successive layers including a top electrode layer, a bottom electrode layer, and an electrolyte layer situated between the top electrode layer and the bottom electrode layer, at least the electrolyte layer and one of the top electrode layer and the bottom electrode layer having an organic matrix, wherein the organic matrix of the electrolyte layer has an ionic conductivity in a range of $\geq 10^{-6}$ S/cm;
    wherein the layers having an organic matrix form a matrix because of their intrinsic ionic conductivity, and wherein the matrix permits a distribution of ions to embedded storage materials without requiring a high topographic surface as an interface to adjacent layers,
    wherein the energy store includes a rechargeable lithium-ion battery, and
    wherein the organic matrix includes a material which is selected from the group including chitosan or an organic matrix having functional $SO_3X$ groups.

11. A configuration, comprising:
    at least three successive layers including a top electrode layer, a bottom electrode layer, and an electrolyte layer situated between the top electrode layer and the bottom electrode layer, at least the electrolyte layer and one of the top electrode layer and the bottom electrode layer having an organic matrix, wherein the organic matrix of the electrolyte layer has an ionic conductivity in a range of $\geq 10^{-6}$ S/cm;

wherein the organic matrix includes a material which is selected from the group including chitosan or an organic matrix having functional $SO_3X$ groups.

12. The configuration as recited in claim 11, wherein an auxiliary embedded in the organic matrix includes carbon nanotubes.

\* \* \* \* \*